(12) United States Patent
Sugiyama

(10) Patent No.: US 11,500,527 B2
(45) Date of Patent: Nov. 15, 2022

(54) PRESENTATION MATERIAL CREATION APPARATUS, PRESENTATION MATERIAL CREATION METHOD, AND PRESENTATION MATERIAL CREATION PROGRAM

(71) Applicant: LoiLo Inc., Yokohama (JP)

(72) Inventor: Koji Sugiyama, Yokohama (JP)

(73) Assignee: LoiLo Inc., Yokohama (JP)

( * ) Notice: Subject to any disclaimer, the term of this patent is extended or adjusted under 35 U.S.C. 154(b) by 0 days.

(21) Appl. No.: 17/277,693

(22) PCT Filed: Apr. 17, 2019

(86) PCT No.: PCT/JP2019/016452
§ 371 (c)(1),
(2) Date: Mar. 18, 2021

(87) PCT Pub. No.: WO2020/059196
PCT Pub. Date: Mar. 26, 2020

(65) Prior Publication Data
US 2021/0349613 A1  Nov. 11, 2021

(30) Foreign Application Priority Data

Sep. 21, 2018 (JP) .............................. JP2018-178049
Nov. 2, 2018 (JP) .............................. JP2018-207698

(51) Int. Cl.
*G06F 3/0484* (2022.01)
*G06F 3/0488* (2022.01)
(Continued)

(52) U.S. Cl.
CPC ........ *G06F 3/04845* (2013.01); *G06F 3/0486* (2013.01); *G06F 3/04842* (2013.01); *G06F 3/04847* (2013.01); *G06F 3/04883* (2013.01)

(58) Field of Classification Search
None
See application file for complete search history.

(56) References Cited

U.S. PATENT DOCUMENTS 6,693,652 B1 * 2/2004 Barrus .................. G06F 3/0481
715/838
6,738,075 B1 * 5/2004 Torres .................... H04N 5/262
348/E5.051
(Continued)

FOREIGN PATENT DOCUMENTS

JP    H08-30417 A     2/1996
JP    2009-129223 A   6/2009
(Continued)

OTHER PUBLICATIONS

Moscovich et al, "Customizable presentations", 2004 (Year: 2004).*
(Continued)

*Primary Examiner* — Jordany Nunez
(74) *Attorney, Agent, or Firm* — Knobbe, Martens, Olson & Bear, LLP

(57) ABSTRACT

To improve convenience when creating slides for a presentation. A presentation material creation apparatus includes a material creation unit that creates a card-shaped object in which characters or a figure can be placed on the basis of an operation of a user through a GUI (graphical user interface) and places the object on a field, and also sets an order for the multiple objects, and a material playback unit that outputs a presentation material outputting the objects in the set order. When one object is superimposed on another object by an operation of the user, the material creation unit creates an object in which the one object is placed inside the other object.

7 Claims, 13 Drawing Sheets

(51) Int. Cl.
*G06F 3/0486* (2013.01)
*G06F 3/04845* (2022.01)
*G06F 3/04842* (2022.01)
*G06F 3/04847* (2022.01)
*G06F 3/04883* (2022.01)

(56) References Cited

U.S. PATENT DOCUMENTS

| | | | | |
|---|---|---|---|---|
| 6,915,490 B1* | 7/2005 | Ewing | ............ | G06F 3/0481 |
| | | | | 715/767 |
| 7,155,676 B2* | 12/2006 | Land | ............ | G11B 27/034 |
| 7,360,159 B2* | 4/2008 | Chailleux | ............ | G06F 3/0481 |
| | | | | 715/977 |
| 7,562,302 B1* | 7/2009 | Barrus | ............ | G06F 3/167 |
| | | | | 715/730 |
| 8,006,192 B1* | 8/2011 | Reid | ............ | G06F 3/0481 |
| | | | | 715/788 |
| 2003/0107604 A1* | 6/2003 | Ording | ............ | G06F 3/0486 |
| | | | | 715/788 |
| 2004/0039934 A1* | 2/2004 | Land | ............ | G11B 27/34 |
| 2005/0278629 A1* | 12/2005 | Chailleux | ............ | G06Q 10/00 |
| | | | | 715/861 |
| 2006/0129933 A1* | 6/2006 | Land | ............ | G11B 27/034 |
| | | | | 345/473 |
| 2010/0146393 A1* | 6/2010 | Land | ............ | G06F 40/166 |
| | | | | 715/723 |
| 2010/0201881 A1* | 8/2010 | Fukuda | ............ | H04N 21/23412 |
| | | | | 348/584 |
| 2013/0232414 A1 | 9/2013 | Neuman et al. | | |
| 2015/0015504 A1 | 1/2015 | Lee et al. | | |
| 2017/0212665 A1 | 7/2017 | Ogasawara | | |
| 2020/0042159 A1* | 2/2020 | Iwaizumi | ............ | G06F 3/04886 |

FOREIGN PATENT DOCUMENTS

| | | |
|---|---|---|
| JP | 2011-138380 A | 7/2011 |
| JP | 2017-134469 A | 8/2017 |
| JP | 2017-182649 A | 10/2017 |

OTHER PUBLICATIONS

International Search Report for International Patent Application No. PCT/JP2019/016452, dated Jun. 4, 2019 in 1 page.
Indian Office Action issued for Indian Patent Application No. 202147017981, dated Feb. 11, 2022 in 6 pages.
Extended European Search Report issued for European Patent Application No. 19862412.4, dated May 11, 2022 in 8 pages.

* cited by examiner

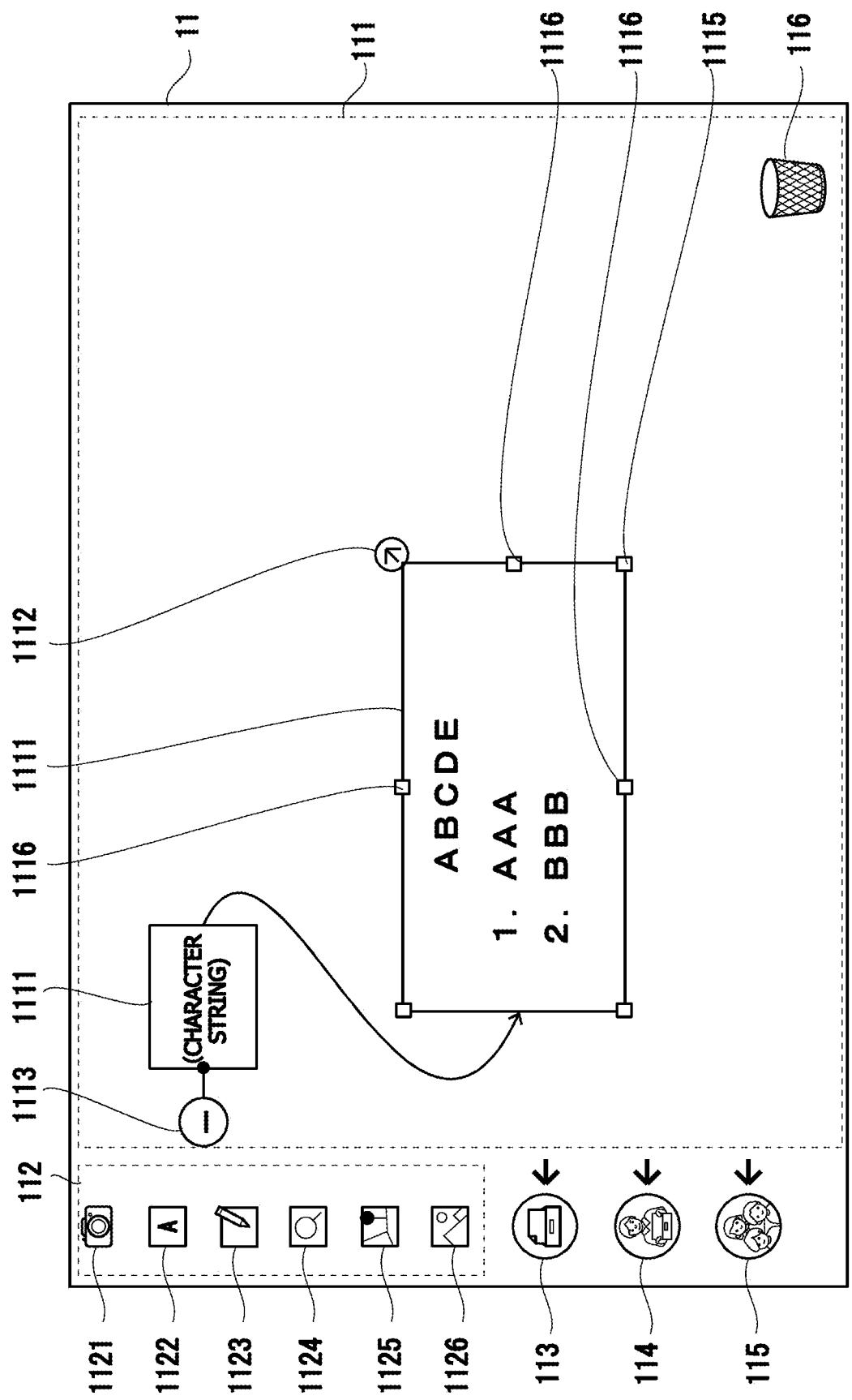

PRESENTATION MATERIAL CREATION APPARATUS, PRESENTATION MATERIAL CREATION METHOD, AND PRESENTATION MATERIAL CREATION PROGRAM

CROSS-REFERENCE TO RELATED APPLICATIONS

This application is the U.S. National Phase under 35. U.S.C. § 371 of International Application PCT/JP2019/016452, filed Apr. 17, 2019, which claims priority to Japanese Patent Application No. 2018-178049, filed Sep. 21, 2018 and to Japanese Patent Application No. 2018-207698, filed Nov. 2, 2018. The disclosures of the above-described applications are hereby incorporated by reference in their entirety.

FIELD

The present invention relates to a presentation material creation apparatus, a presentation material creation method, and a presentation material creation program.

BACKGROUND

Heretofore, various techniques for creating presentation slides have been proposed.

For example, there has been proposed a presentation material creation support apparatus (Patent document 1) in which slide objects corresponding to individual slides are created and placed on a work field in response to tapping operations in empty areas on the work field, a slide flow is created and placed on the work field in response to a dragging operation of a slide object toward an isolated slide object on the work field, and a slide object is added to the slide flow in response to a dragging operation of the slide object toward the slide flow on the work field. In the slide flow, slide objects are arranged linearly at predetermined intervals.

[Patent document 1] Japanese Patent Laid-Open No. 2017-182649

SUMMARY

In a scene where a material is created by trial and error while considering the contents of the presentation, if the user desires to change the content of a certain slide to a more panoramic and broader content, for example, it has been required to create one slide all over again. Additionally, such a troublesome operation may interrupt thoughts regarding the contents of the presentation. In view of the above, the present invention aims to improve convenience when creating slides for a presentation.

A presentation material creation apparatus according to the present invention includes a material creation unit that creates a card-shaped object in which characters or a figure can be placed on the basis of an operation of a user through a GUI (graphical user interface) and places the object on a field, and also sets an order for the multiple objects, and a material playback unit that outputs a presentation material outputting the objects in the set order. When one object is superimposed on another object by an operation of the user, the material creation unit creates an object in which the one object is placed inside the other object.

When one object is superimposed on another object by a user operation, an object in which the one object is placed inside the other object is created. Hence, when a user desires to use a created object as a part of another object, for example, there is no need to create the object all over again. That is, it is possible to freely use an object with no inclusion relationship placed independently on the field as a part of another object. Hence, the user can freely create the presentation material without having his/her thought interrupted by operation of the apparatus. That is, convenience can be improved when creating slides for the presentation.

Additionally, the material creation unit may enlarge or reduce the object placed on the field according to an operation of the user. With this configuration, the user can freely determine the layout when superimposing an object.

Additionally, when the user operates a lower object among multiple objects at least partially overlapping one another on the field, the material creation unit may cause the objects at least partially overlapping the lower object to be operated altogether. With this configuration, the objects superimposed on one another can be handled as one object.

Additionally, in response to an operation of the user, the material creation unit may place on the field a template object on which a predetermined chart is drawn and pre-stored in a memory, or the material creation unit may cause the template object created in response to an operation of the user to be stored in the memory. With this configuration, it is possible to prepare objects useful for organizing contents of the material in advance.

Additionally, in response to an operation of the user, the material creation unit may expand or eliminate an area of the object placed on the field. With this configuration, it is possible to easily adjust the layout balance of contents placed inside one object.

Note that the contents described in "Means for solving the Problems" can be combined without departing from the object and technical scope of the present invention. Additionally, the contents of "Means for solving the Problems" can be provided as a system including an apparatus such as a computer or multiple apparatuses, a method executed by a computer, or a program to be loaded on a computer. Note that a recording medium retaining a program may be provided.

Convenience can be improved when creating slides for a presentation.

BRIEF DESCRIPTION OF THE DRAWINGS

FIG. 13 is a diagram for describing an example of an operation for expanding or trimming a card area.

DESCRIPTION OF EMBODIMENTS

Hereinafter, an embodiment of the present invention will be described with reference to the drawings.

System Configuration

Figure 1:
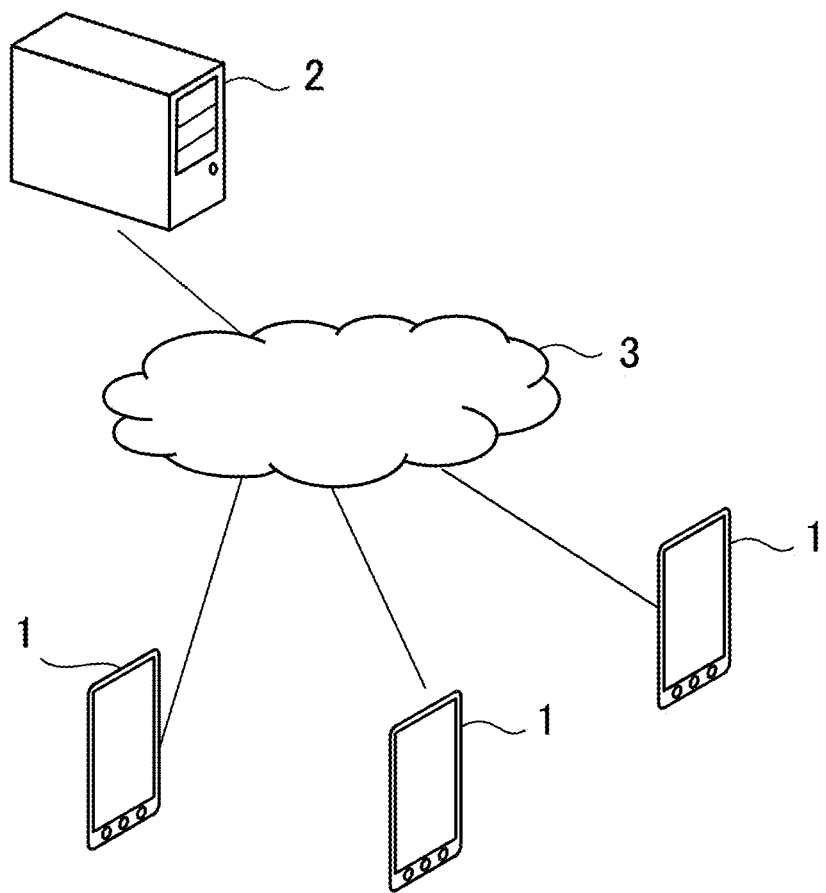
FIG. 1 is a diagram illustrating an example of an entire system according to an embodiment.

FIG. 1 is a diagram illustrating an example of an entire system according to the embodiment. This system includes a user device 1 such as a tablet operated by a user and a server 2 that stores and distributes data such as a presentation material created and played back on the user device 1, and these devices are connected through a network 3. The user device 1 corresponds to a "presentation material creation apparatus" according to the present invention. Note that in the present embodiment, processing for displaying slides included in a presentation material on at least some of the user devices 1 or an unillustrated display, screen, or the like provided in a classroom or the like in full screen, for example, is referred to as "playback". The network 3 is a network such as the Internet, and computers connected to the network 3 can communicate with each other according to various protocols. Additionally, multiple user devices 1 may exist, and may be used by a teacher and a student at school, for example.

Device Configuration

Figure 2:
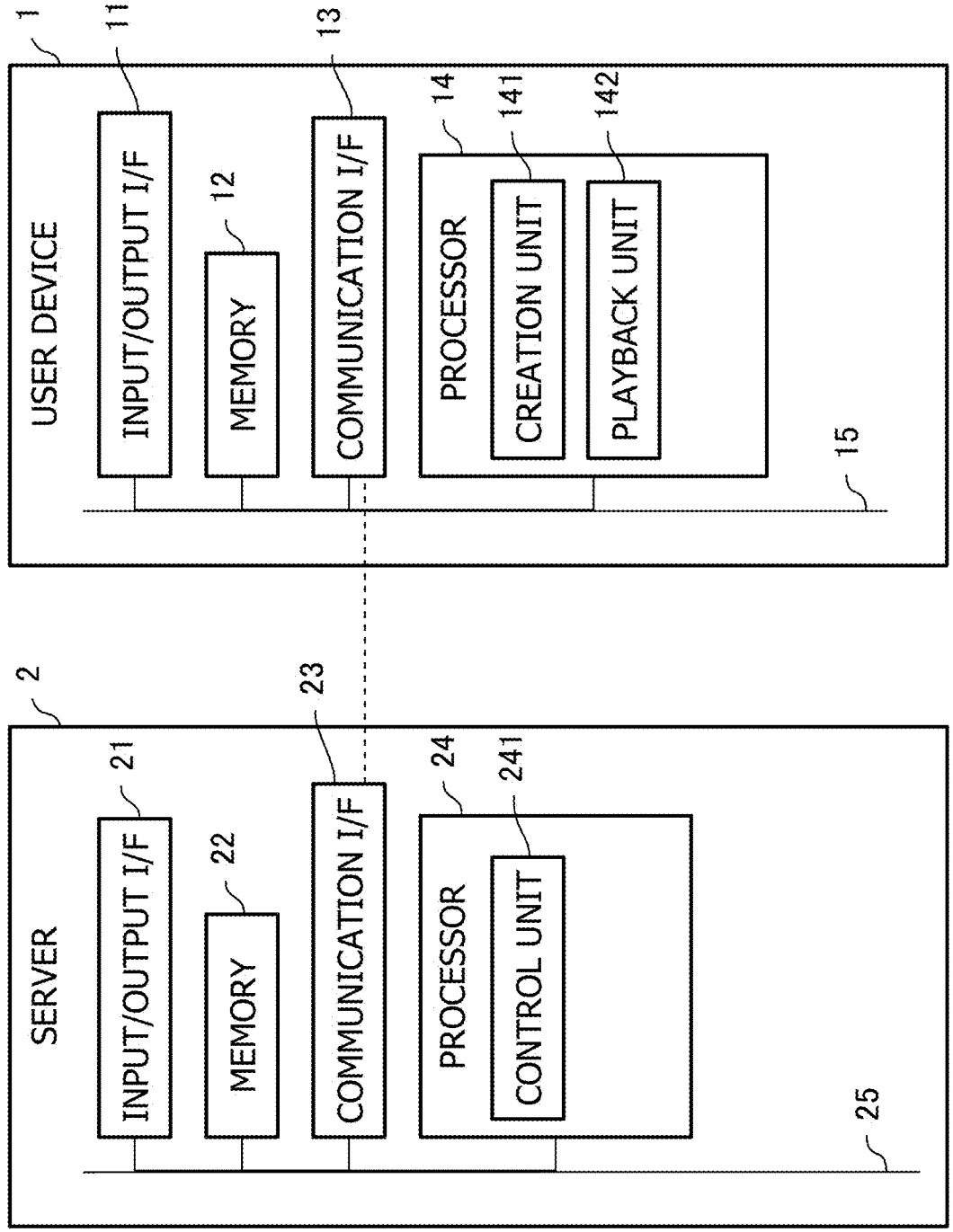
FIG. 2 is a block diagram illustrating an example of configurations of a user device and a server.

FIG. 2 is a block diagram illustrating an example of configurations of the user device 1 and the server 2.

The user device 1 is a general-purpose computer such as a tablet, a smartphone, and a PC (personal computer), and includes an input/output interface (I/F) 11, a memory 12, a communication interface (I/F) 13, a processor 14, and a bus 15. The input/output I/F 11 is a user interface such as a touch panel, a keyboard, a mouse, a microphone, a speaker, and a camera, for example. The input/output I/F 11 accepts user operation and also outputs information to the user. The memory 12 is a main memory such as a RAM (random access memory) and a ROM (read only memory), and an auxiliary memory (secondary memory) such as an HDD (hard-disk drive), an SSD (solid state drive), and a flash memory. The main memory temporarily stores a program read by the processor 14, and secures a work area of the processor 14. The auxiliary memory stores a program executed by the processor 14 and other data. The communication I/F 13 is a network module for performing communication with a base station of a cellular phone or an access point of a wireless LAN (local area network), and performs communication according to a predetermined protocol. The processor 14 is a processor such as a CPU (central processing unit), and operates as a function unit that performs various processing described in the present embodiment by executing a program. In the example of FIG. 2, functional blocks are illustrated in the processor 14. Specifically, the processor 14 functions as a creation unit 141 that creates a file such as a presentation material, and a playback unit 142 that plays back the file. The components described above are connected through the bus 15.

Additionally, the server 2 is a general-purpose computer for providing a so-called cloud service, and includes an input/output I/F 21, a memory 22, a communication I/F 23, a processor 24, and a bus 25. The input/output I/F 21 is a user interface such as a keyboard, a mouse, and a display, for example. The memory 22 is a main memory such as a RAM and a ROM, and an auxiliary memory such as an HDD, an SSD, and a flash memory. The main memory temporarily stores a program read by the processor 24 and files stored in the auxiliary memory, and secures a work area of the processor 24. The auxiliary memory stores a program executed by the processor 24 and other data. The communication I/F 23 is a wired network card or the like, and performs communication according to a predetermined protocol. The processor 24 is a processor such as a CPU, and operates as a function unit that performs various processing described in the present embodiment by executing a program. As illustrated in FIG. 2, the processor 24 functions as a control unit 241. The control unit 241 controls file exchange between the user devices 1, and receives a file created in the user device 1 through the communication I/F 23 to store the file in the memory 22. The components described above are connected through the bus 25.

<User Interface>

Figure 3:
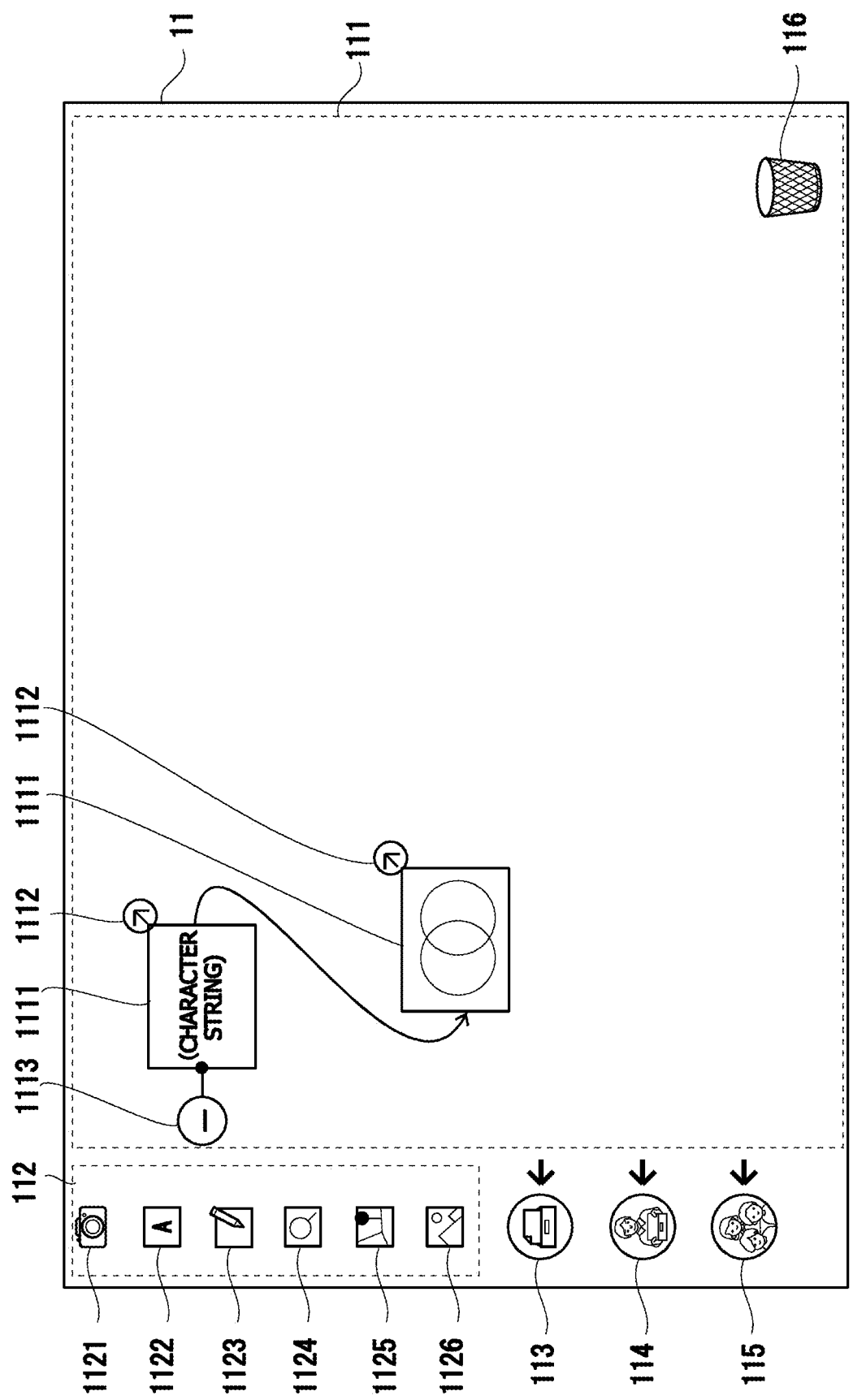
FIG. 3 is a diagram illustrating an example of a GUI displayed on the user device.

FIG. 3 is a diagram illustrating an example of a GUI (graphical user interface) displayed on the user device 1 in processing of creating a file of a presentation material. An operation screen of FIG. 3 is displayed on the input/output I/F 11 such as the touch panel mentioned above. In the example of FIG. 3, in the input/output I/F 11, displayed are a field 111 that displays aft a card-like object (simply referred to as "card") or the like to be a slide of the presentation material, a card addition menu 112 for adding a card 1111 to the field 111, a material box icon 113 for saving created files, a submission icon 114 for transmitting at least some of the cards to the user device 1 used by the teacher, a transmission icon 115 for transmitting at least some of the cards to the user device 1 used by another student, and a trash can icon 116 for deleting at least some of the cards. Additionally, in the card addition menu 112, displayed are a camera icon 1121 for adding to the field 111 a card that captures and displays a photograph or a video, a text icon 1122 for adding to the field 111 a card that displays a character string, a drawing icon 1123 for adding to the field 111 a card that displays a freely drawn image, a web icon 1124 for adding to the field 111 a card that displays an image captured on a website, a map icon 1125 for adding to the field 111 a card for displaying a captured image of a map or a satellite photograph, and a camera roll icon 1126 for adding to the field 111 a card that displays an image or a video saved in the memory 12.

Two cards 1111 are displayed in the field 111. Assume that a character string is displayed on the upper card 1111. Assume that shapes are displayed on the lower card 1111. The user can move the card 1111 within the field 111 by dragging. Additionally, an arrow icon 1112 for defining a playback order for multiple cards 1111 is displayed on the upper right of each card 1111. For example, when the user drags the arrow icon 1112 of one card 1111 toward another card 1111 and connects the two cards 1111, it is possible to define the order of playback from the connection source to the connection destination. At this time, the front and rear cards 1111 are connected by an arrow (cards are connected by arrow in advance in the example of FIG. 3). Note that the arrow may be configured such that the connection destination can be changed to another card, or the connection can be canceled by a tapping operation, for example. Additionally, of the multiple cards 1111 connected by arrows, a slide on the side of a starting point of the arrows has a plus/minus icon 1113 displayed thereon for folding or expanding the card group. For example, assume that when the icon 1113 displaying a minus illustrated in FIG. 3 is tapped, multiple cards 1111 connected by arrows are compactly gathered on top of one another and the display of the icon 1113 is changed to a plus (not shown). Meanwhile, assume that when the icon 1113 displaying a plus is tapped, the gathered multiple cards 1111 are expanded and the display of the icon 1113 is changed to a minus. When expanding, the cards 1111 may be arranged linearly, or may return to an arrangement before they were folded. Additionally, multiple other folded card 1111 groups may be connected.

Additionally, it is possible to enlarge and reduce the field 111 by pinching out and pinching in. Also, it is possible to enlarge and reduce the card 1111 by pinching out and pinching in. By placing one card 1111 on top of another card 1111, it is possible to create one slide displaying the one card 1111 inside the other card 1111. At this time, by setting the ratio between sizes of contents of the cards to the ratio between sizes of the superimposed cards on the field 111, the user can create the slide intuitively. Additionally, a slide including two or more superimposed cards can be moved or changed in size (enlarged or reduced) while maintaining the arrangement and magnitude relationship among the cards. That is, when one card is superimposed on another card by a user operation, a card (slide) in which the one card is placed inside the other card is created. Meanwhile, when the user drags the one card superimposed on the other card and moves the one card out of the other card, each card returns to an independent card with no inclusion relationship.

Material Creation Processing

Figure 4:
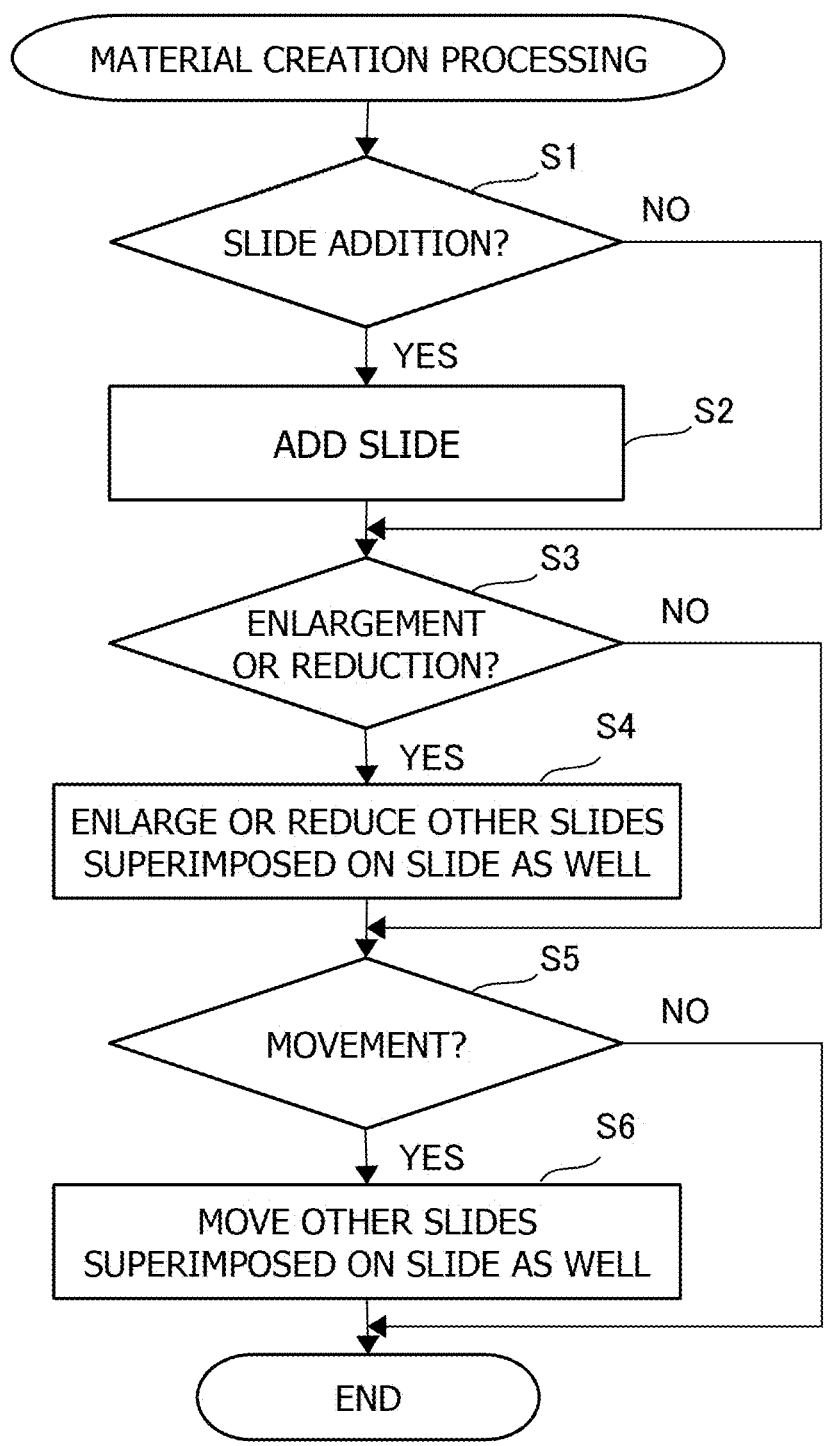
FIG. 4 is a processing flow chart illustrating an example of material creation processing.

FIG. 4 is a processing flow chart illustrating an example of material creation processing performed in this system. Note that material creation processing corresponds to a "presentation material creation method" according to the present invention. First, the creation unit 141 determines whether a user's operation is addition of a slide (FIG. 4: S1). In this step, if the user taps any icon in the card addition menu 112, it is determined that the operation is slide addition. If the user's operation is addition of a slide (S1: YES), a new card is added onto the field 111 (S2).

Figure 5:
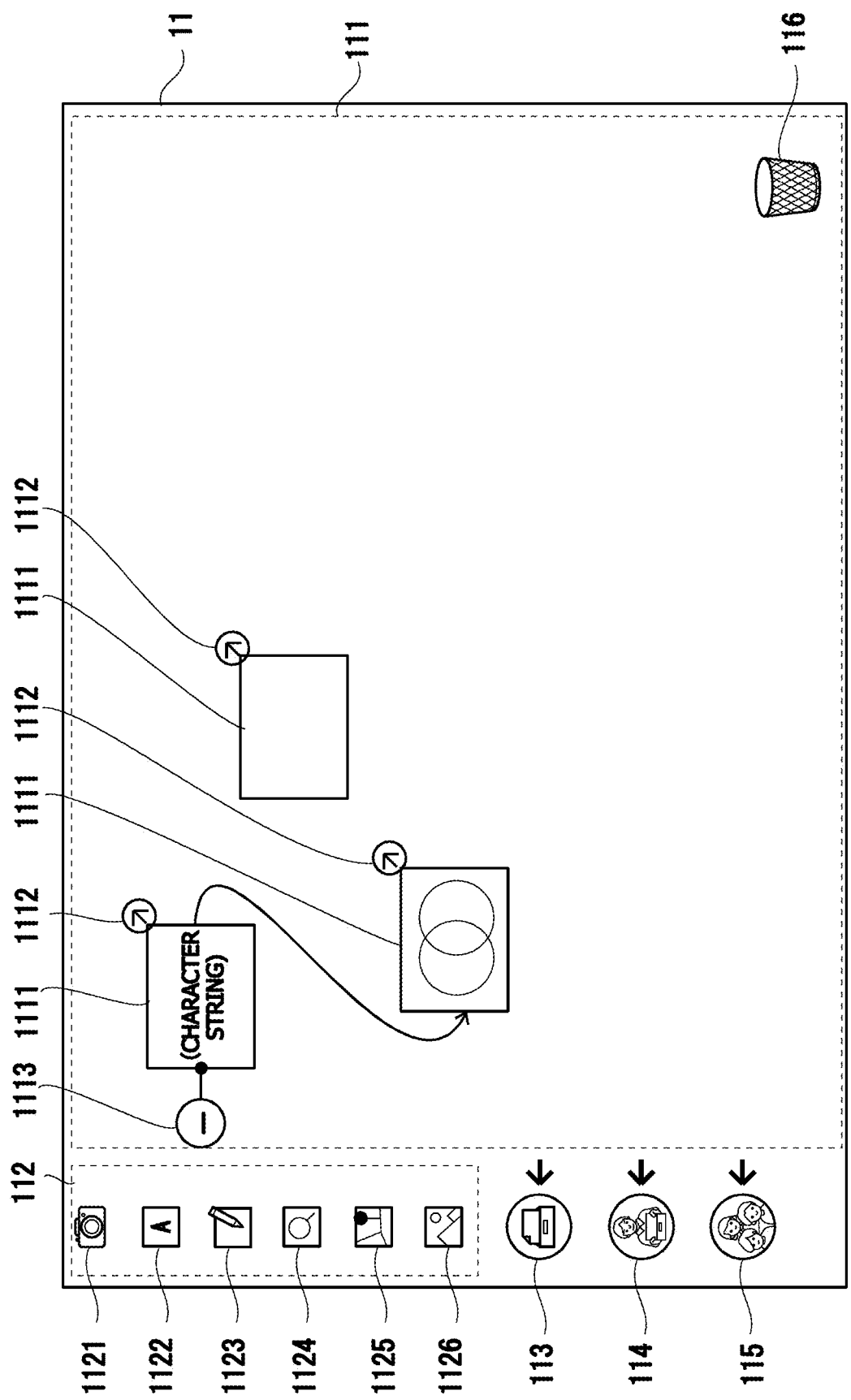
FIG. 5 is a diagram illustrating an example of a screen to which a card is added.

FIG. 5 is a diagram illustrating an example of a screen to which a card is added. The right card 1111 in FIG. 5 is created by the drawing icon 1123, for example, and the user can draw freely on the card by tapping the right card 1111, for example.

Figure 6:
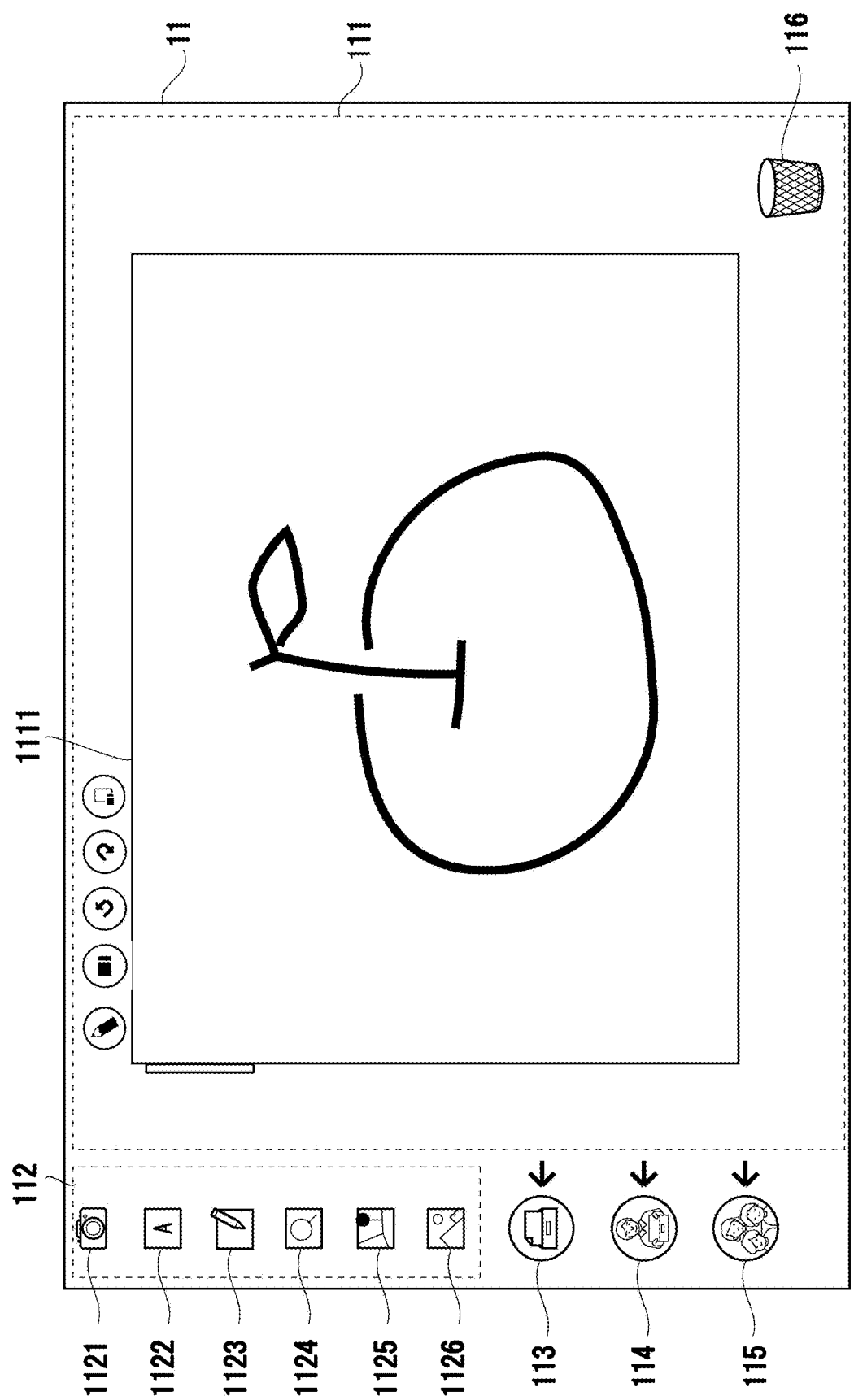
FIG. 6 is a diagram illustrating an example of a screen for drawing on a card.

FIG. 6 is a diagram illustrating an example of a screen for drawing on a card. In the example of FIG. 6, one card 1111 is displayed in full screen, and the user can draw freely within the card 1111 by the trajectory of a pointer. That is, an image drawn freely by the user can be displayed on the card 1111 added by tapping the drawing icon 1123. Note that a photograph or a video can be captured and displayed on a card added by tapping the camera icon 1121. A character string can be displayed on a card 1111 added by tapping the text icon 1122. An image captured on a website can be displayed on the card 1111 added by tapping the web icon 1124. A captured image of a map or a satellite photograph can be displayed on the card 1111 added by tapping the map icon 1125. Additionally, an image or a video saved in the memory 12 can be displayed on the card 1111 added by tapping the camera roll icon 1126.

After S2 of FIG. 4, or if it is determined in S1 that the user's operation is not addition of a slide (S1: NO), the creation unit 141 determines whether the user's operation is change of slide size (enlargement or reduction) (FIG. 4: S3). In this step, if the user pinches out or pinches in on any of the cards 1111, it is determined that an enlargement or reduction operation has been performed (S3: YES), and the size of the card 1111 to be operated is changed on the field 111 (S4). At this time, if the cards at least partially overlap one another, the size of all of the cards superimposed with respect to predetermined coordinates is changed.

Figure 7:
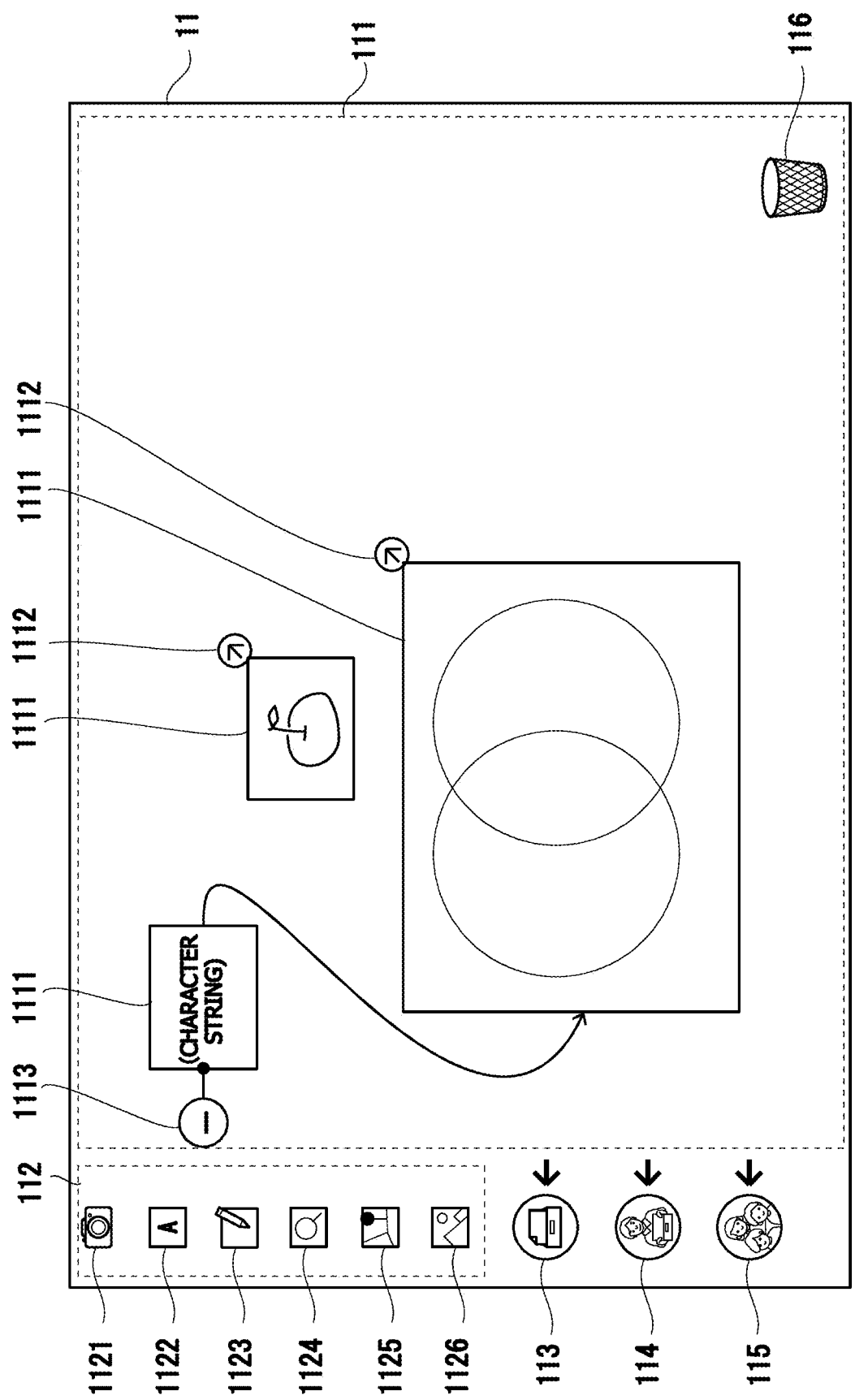
FIG. 7 is a diagram illustrating an example of a screen after a card has been enlarged.

FIG. 7 is a diagram illustrating an example of a screen after a card has been enlarged. In the example of FIG. 7, the card 1111 on which a Venn diagram is drawn is enlarged.

Additionally, after S4 of FIG. 4, or if it is determined in S3 that the user's operation is not enlargement or reduction (S3: NO), the creation unit 141 determines whether the user's operation is moving a slide (FIG. 4: S5). In this step, if the user's operation is dragging the card 1111, it is determined that the user's operation is moving the card 1111 (S5: YES), and the position of the card 1111 is changed (S6). At this time, if the cards at least partially overlap one another, all of the superimposed cards are moved in parallel. Additionally, when one card 1111 is moved and superimposed on another card 1111, the one card 1111 is placed above the other card. Note that when superimposed cards 1111 are played back as a presentation material, one slide displaying the uppermost content is displayed on the basis of the up-down relationship between a lower card 1111 serving as the outer edge of the slide and the cards 1111 superimposed on the lower card 1111.

Figure 8:
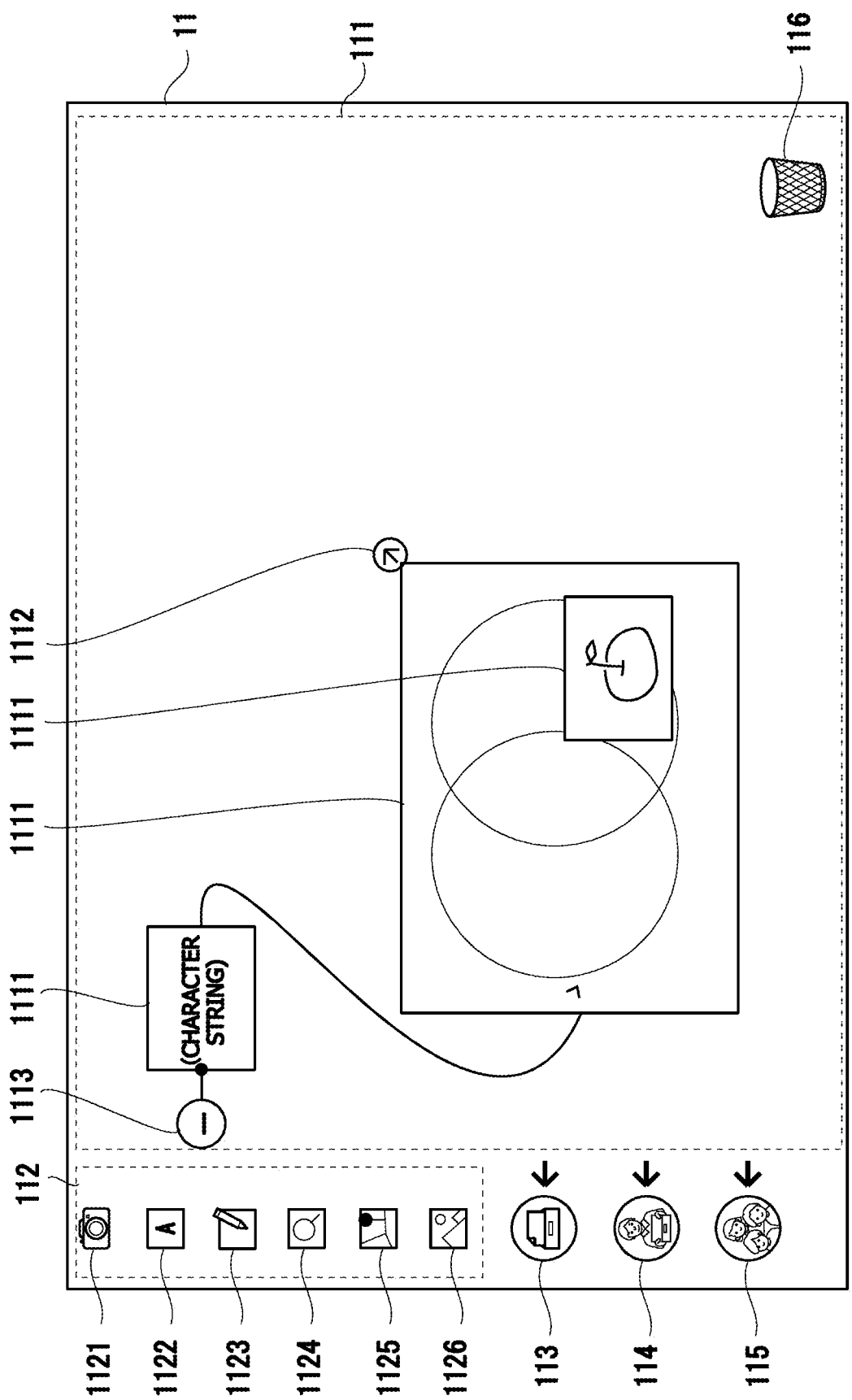
FIG. 8 is a diagram illustrating an example of a screen after the position of a card has been changed.

FIG. 8 is a diagram illustrating an example of a screen after the position of a card has been changed. In the example of FIG. 8, the card 1111 on which a picture is drawn is moved and superimposed on the card 1111 on which a Venn diagram is drawn, by a user operation.

Additionally, after S6 of FIG. 4, or if it is determined in S5 that the user's operation is not a moving operation (S5: NO), the material creation processing of FIG. 4 is ended. A file of the presentation material created in this way is stored in the memory 12 of the user device 1 or the memory 22 of the server 2. Note that the processing of FIG. 4 is continuously performed while the program according to the embodiment is executed. Additionally, other than the processing specified in FIG. 4, various processing described using the screen of FIG. 3 can be performed.

Figure 9:
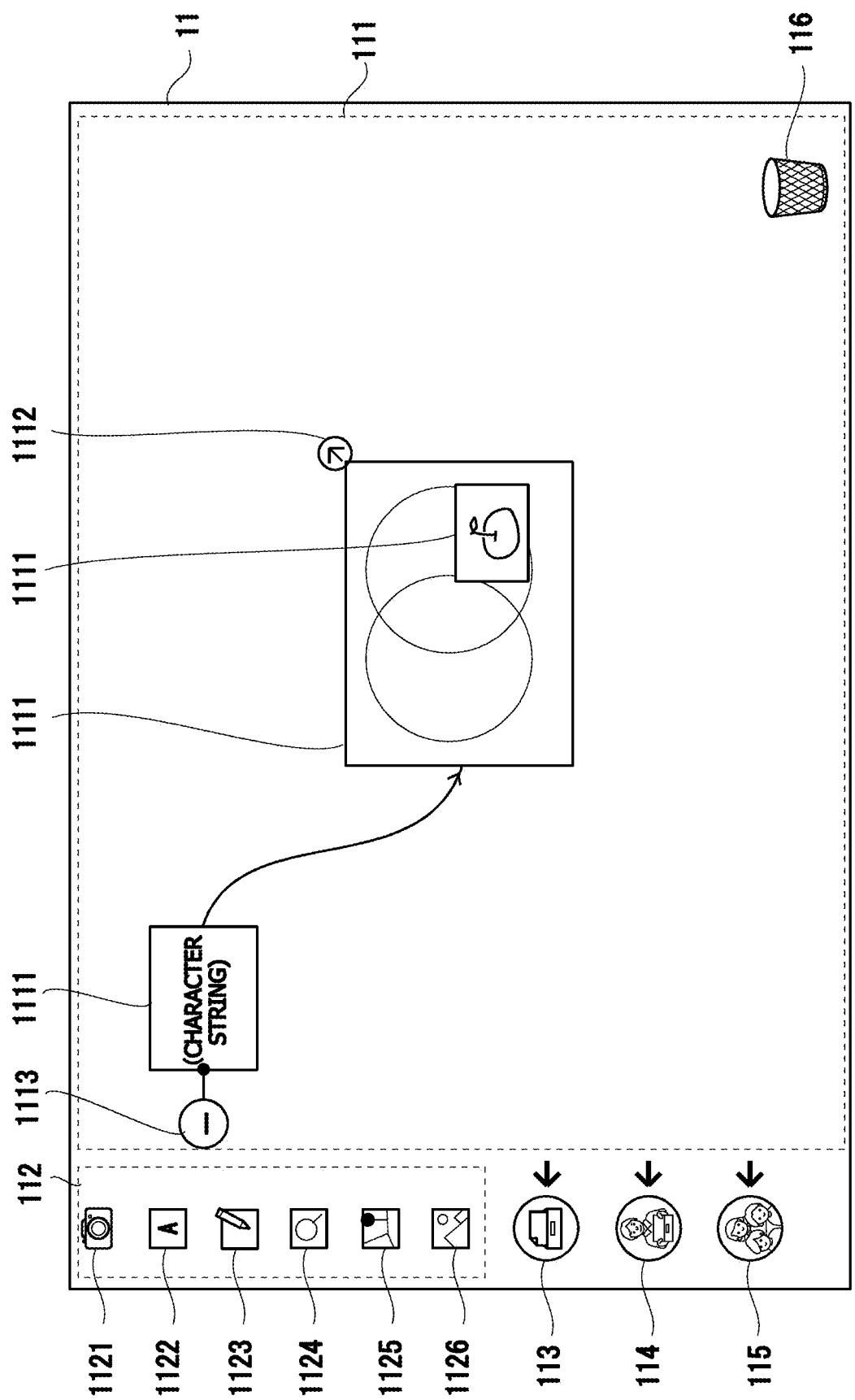
FIG. 9 is a diagram illustrating an example of a screen after the position and size of a card have been changed further.

FIG. 9 is a diagram illustrating an example of a screen after the position and size of a card have been changed further. The screen illustrated in FIG. 9 is different from the screen illustrated in FIG. 8 in that the position and size of the card 1111 on which a Venn diagram is drawn and the card 1111 superimposed thereon are changed while maintaining the positional relationship and size ratio between the cards 1111.

Playback Processing

Figure 10:
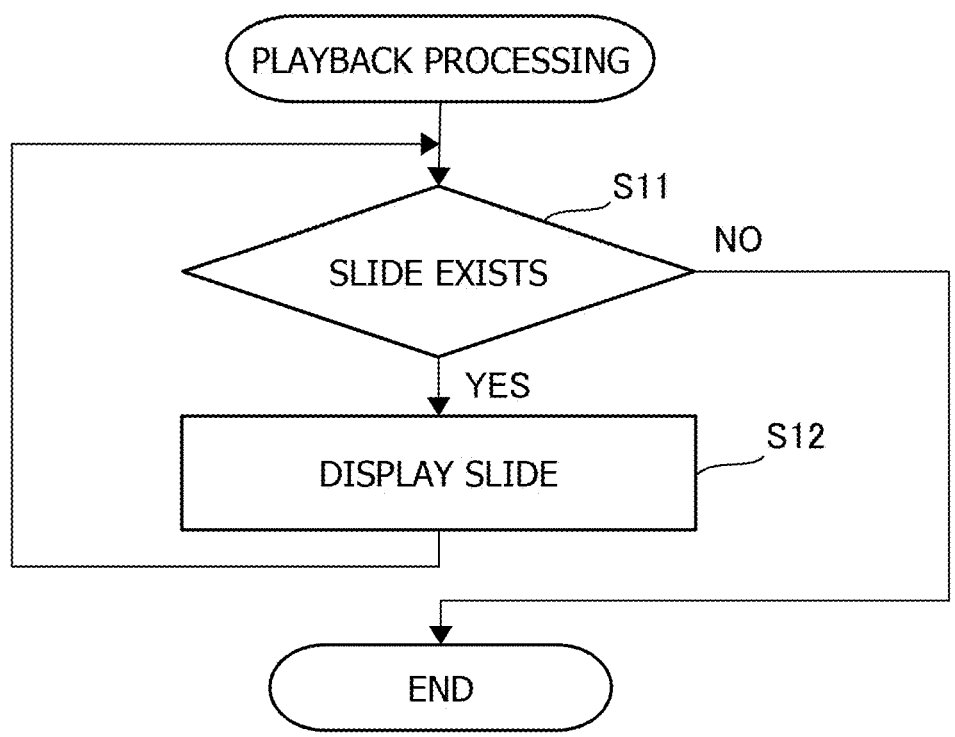
FIG. 10 is a processing flow chart illustrating an example of playback processing.

FIG. 10 is a processing flow chart illustrating an example of playback processing. The playback unit 142 of the user device 1 plays back a presentation material including one or more slides for which playback is instructed by a user operation. First, the playback unit 142 determines whether there is any slide that has not been played back (FIG. 10: S11). In this step, one slide that has not been played back is extracted from a card closest to the start point among multiple cards connected by arrows. Note that if the presentation material includes only one slide, this slide is extracted.

If there is a slide that has not been played back (S11: YES), the playback unit 142 displays the extracted slide (S12). In this step, the playback unit 142 displays the slide in full screen, for example, on the input/output I/F 11 such as a touch panel or a display. Thereafter, if an instruction to proceed to the next slide is input by the user, the processing returns to S11 and the processing is repeated. On the other hand, if there is no slide that has not been played back (S11: NO), the playback unit 142 ends the playback processing.

Effect

According to the material creation processing described above, when creating a material by trial and error while considering the contents, if the user desires to use a created card as a part of another card, there is no need to create a card all over again. That is, it is possible to freely use a card 1111 with no inclusion relationship placed independently on the field 111 as a part of another card 1111. Hence, the user can gather his/her thoughts freely without being interrupted by operation of software. That is, convenience can be improved when creating slides for a presentation.

Modification 1

Figure 11:
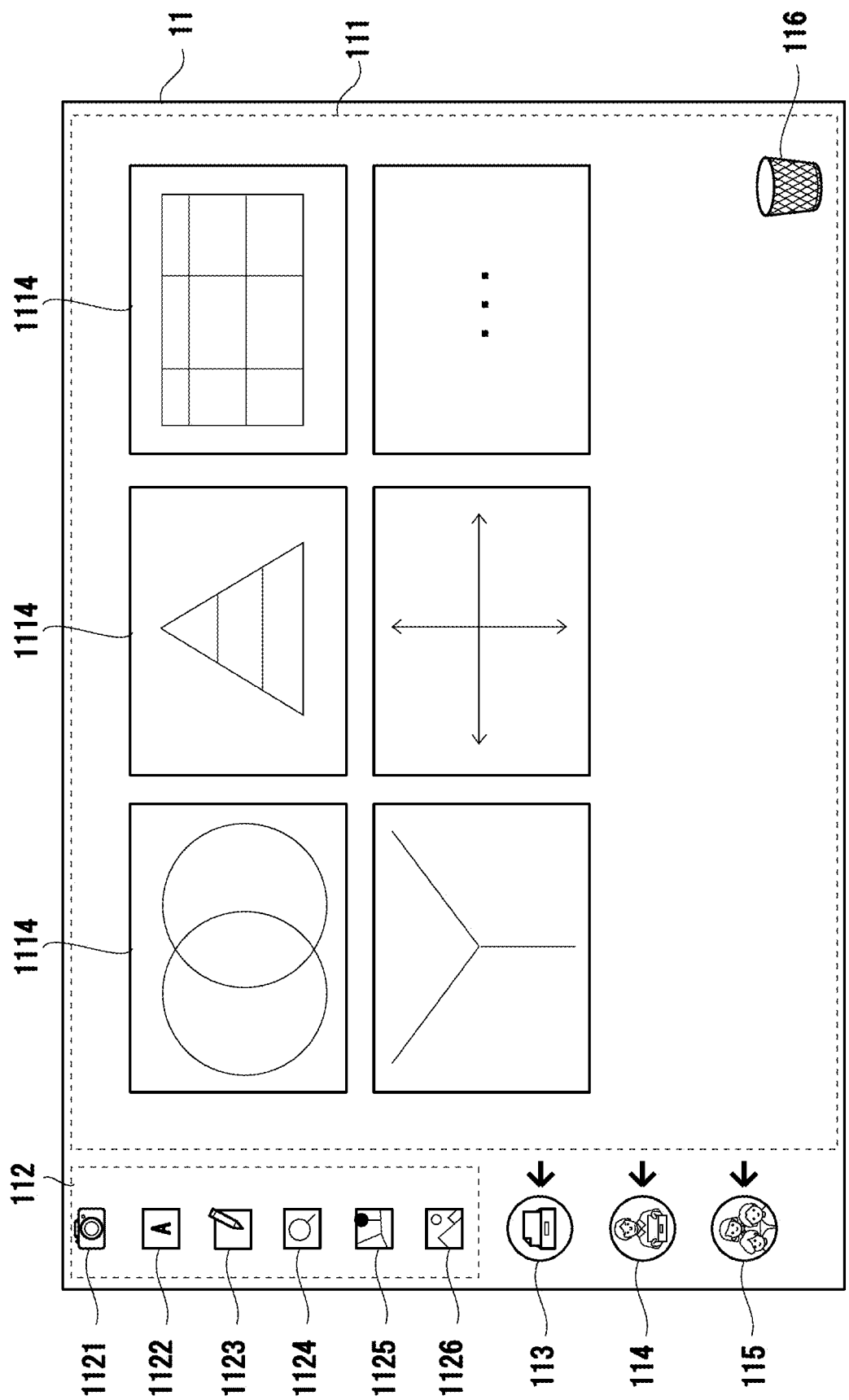
FIG. 11 is a diagram illustrating an example of cards on which charts are drawn.

FIG. 11 is a diagram illustrating an example of cards on which charts are drawn. For example, a card on which a chart such as a Venn diagram, a pyramid chart, a matrix, a Y-chart, or coordinate axes is drawn may be stored in the memory 12 as a template. Such a card is useful for organizing contents of the presentation, and improves convenience if the card can be easily read out. Additionally, the user may create such a chart or the like, and the chart may be added to a template to be stored. With such a configuration, a teacher creating a learning material, for example, can create a chart or the like suitable for his/her class, and can facilitate understanding of the class.

Modification 2

Figure 12:
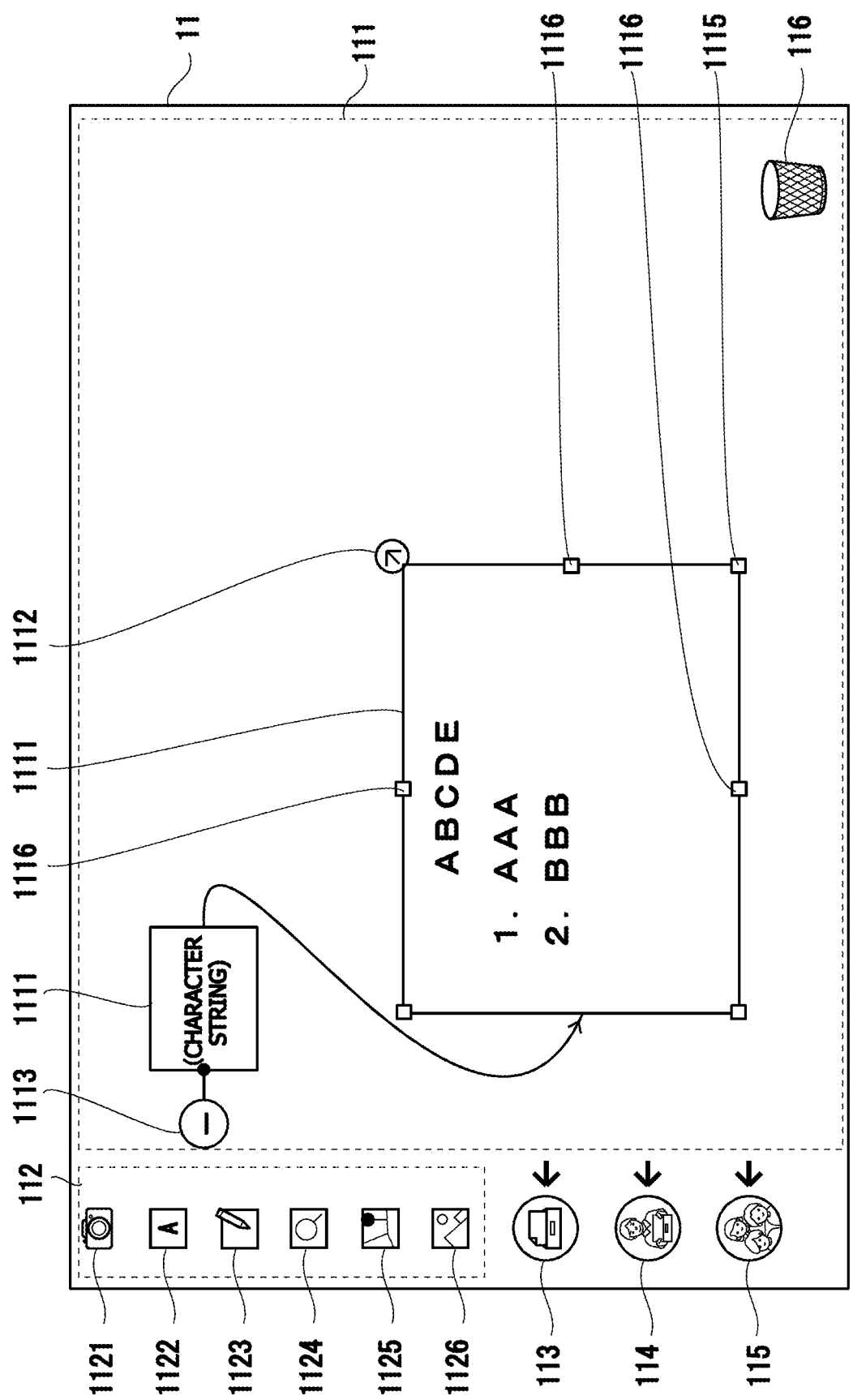
FIG. 12 is a diagram for describing an example of an operation for expanding or trimming a card area.

FIGS. 12 and 13 are diagrams for describing an example of an operation for expanding or trimming a card area. The card 1111 may be capable not only of enlargement and reduction, but also of expansion and elimination (e.g., trimming) of an area. In the example of FIGS. 12 and 13, the peripheral edge of the card 1111 on which character strings "ABCDE" and so on are added includes an operation area 1115 for enlarging and reducing the card 1111 and an operation area 1116 for expanding and eliminating the area of the card 1111. While the operation area 1115 is provided near a vertex of the substantially rectangular card 1111 and the operation area 1116 is provided near the center of a side of the substantially rectangular card 1111 in the example of FIGS. 12 and 13, the positions of the operation areas are not limited to such positions. For example, the operation area 1116 may be provided over an entire side of the card 1111 except for the end points thereof.

The user can drag the operation area 1115, for example, to enlarge or reduce the size of the card 1111. Note that instead of such an area, pinch-in and pinch-out operations may be used to enable the enlargement and reduction. Additionally, during the enlargement and reduction processing, the aspect ratio may either be maintained, or not be maintained.

The user can drag the operation area 1116, for example, to expand and eliminate the area of the card 1111. In the example of FIG. 12, when the operation area 1116 provided in the lower side of the card 1111 on which character strings "ABCDE" and so on are added is dragged upward, the lower side of the card 1111 moves upward in parallel and the area is eliminated from the lower end of the card 1111 by the amount of parallel movement, as illustrated in the example of FIG. 13, for example.

For example, when the user runs out of space to write on the card 1111, an area can be added in any direction of the four sides of the card 1111. Additionally, when there is an unnecessary space or an unnecessary part of an image at the edge of the card 1111, the area can be eliminated in any size from the four sides of the card 1111. Note that in a scene where presentation is performed, the entire cards 1111 to which an order is set are displayed in full screen on a monitor or a screen. At this time, the aspect ratio of the card 1111 may be maintained. According to the processing of expanding and eliminating the area of the card 1111, it is possible to easily adjust the arrangement balance of contents included in one slide. Note that when a character string is placed on the card 1111, if the area of the card 1111 is eliminated, the character string may wrap, the size of the font may be reduced, or display of the character string placed in the eliminated area may be omitted.

Modification 3

When the user superimposes one card 1111 on another card 1111, the size of the one card 1111 on the field 111 may be automatically reduced to fit inside the other card 1111. Note that the degree of reduction is arbitrary, and may be set so that the ratio of the one card 1111 to the other card 1111 is a predetermined ratio, for example. With this configuration, convenience when placing one card 1111 inside another card 1111 is improved. Note that three or more cards 1111 may be nested inside one another.

Other

The above configurations of the embodiment are examples, and can be combined and modified within the object and technical idea of the present invention.

While the embodiment has been described on the assumption that a presentation material including a slide formed of one or more cards is created, the created data may be an electronic notebook including pages formed of one or more cards.

The present invention includes a computer program that performs the above processing. Further, a computer readable recording medium recording the program is also within the scope of the present invention. As for the recording medium recording the program, the above processing can be performed by loading and executing the program of the recording medium on a computer.

Here, a computer readable recording medium refers to a recording medium that can accumulate information such as data and programs by an electric, magnetic, optical, mechanical, or chemical action, and is readable on a computer. Of such recording mediums, examples of those detachable from a computer include a flexible disk, a magneto-optical disk, an optical disk, a magnetic tape, and a memory card. Examples of a recording medium fixed to a computer include a hard disk drive and a ROM.

DESCRIPTION OF THE REFERENCE NUMERALS AND SYMBOLS

1: user device
11: input/output I/F
12: memory
13: communication I/F
14: processor
141: creation unit
142: playback unit
15: bus
2: server
21: input/output I/F
22: memory
23: communication I/F
24: processor
241: control unit
25: bus
3: network

What is claimed is:

1. A presentation material creation apparatus comprising a material creation unit that creates a card-shaped object in which characters or a figure can be placed on the basis of an operation of a user through a GUI (graphical user interface) and places the object on a field, and also sets an order for a plurality of the objects, and a material playback unit that outputs a presentation material outputting the objects in the set order, wherein when a first object is superimposed on a second object by an operation of the user, the material creation unit creates an object in which the first object is placed inside the second object, and when the second object is superimposed on the first object by an operation of the user, the material creation unit creates an object in which the second object is placed inside the first object.

2. The presentation material creation apparatus according to claim 1, wherein the material creation unit enlarges or reduces the object placed on the field according to an operation of the user.

3. The presentation material creation apparatus according to claim 1, wherein when the user operates a lower object among a plurality of the objects at least partially overlapping one another on the field, the material creation unit causes the objects at least partially overlapping the lower object to be operated altogether.

4. The presentation material creation apparatus according to claim 1, wherein in response to an operation of the user, the material creation unit places on the field a template object on which a predetermined chart is drawn and prestored in a memory, or the material creation unit causes the template object created in response to an operation of the user to be stored in the memory.

5. The presentation material creation apparatus according to claim 1, wherein in response to an operation of the user, the material creation unit expands or eliminates an area of the object placed on the field.

6. A presentation material creation method comprising a material creation step of creating a card-shaped object in which characters or a figure can be placed on the basis of an operation of a user through a GUI (graphical user interface) and placing the object on a field, and also setting an order for a plurality of the objects, and a material playback step of outputting a presentation material outputting the objects in the set order, the steps executed by a computer, wherein in the material creation step, when a first object is superimposed on a second object by an operation of the user, an object in which the first object is placed inside the second object is created, and when the second object is superimposed on the first object by an operation of the user, an object in which the second object is placed inside the first object is created.

7. A non-transitory computer readable medium having a program stored thereon for executing a computer to perform a method for creating presentation material, the method comprising:
a material creation step of creating a card-shaped object in which characters or a figure can be placed on the basis of an operation of a user through a GUI (graphical user interface) and placing the object on a field, and also setting an order for a plurality of the objects, and
a material playback step of outputting a presentation material outputting the objects in the set order, wherein in the material creation step, when a first object is superimposed on a second object by an operation of the user, an object in which the first object is placed inside the second object is created, and when the second object is superimposed on the first object by an operation of the user, an object in which the second object is placed inside the first object is created.

* * * * *